United States Patent
Lee et al.

(10) Patent No.: US 7,916,825 B2
(45) Date of Patent: Mar. 29, 2011

(54) FUEL ROD OF NUCLEAR FUEL ASSEMBLY

(75) Inventors: Shin-ho Lee, Daejeon (KR); Yoon-ho Kim, Daejeon (KR); Kyou-seok Lee, Daejeon (KR); Kyu-Tae Kim, Daejeon (KR); Jung-min Suh, Daejeon (KR); Nam-Gyu Park, Daejeon (KR); Kyong-bo Eom, Daejeon (KR); Joon-kyoo Park, Daejeon (KR); Jin-sun Kim, Daejeon (KR)

(73) Assignee: Kepco Nuclear Fuel Co., Ltd., Daejeong (KR)

( * ) Notice: Subject to any disclaimer, the term of this patent is extended or adjusted under 35 U.S.C. 154(b) by 0 days.

(21) Appl. No.: 11/970,961

(22) Filed: Jan. 8, 2008

(65) Prior Publication Data
US 2009/0060116 A1    Mar. 5, 2009

(30) Foreign Application Priority Data
Aug. 27, 2007    (KR) .................. 10-2007-0086137

(51) Int. Cl.
G21C 3/00    (2006.01)
G21C 19/00    (2006.01)
F16F 1/18    (2006.01)
F16F 1/20    (2006.01)
F16F 1/00    (2006.01)

(52) U.S. Cl. ........ 376/418; 376/261; 376/409; 376/412; 376/420; 267/158; 267/160; 267/164; 267/70; 267/71

(58) Field of Classification Search .............. 376/261, 376/409, 418, 412, 420; 267/70, 71, 158, 267/160, 164
See application file for complete search history.

(56) References Cited

U.S. PATENT DOCUMENTS

| | | | |
|---|---|---|---|
| 4,460,540 A * | 7/1984 | Funk et al. ................. 376/327 |
| 4,678,924 A * | 7/1987 | Loriot et al. ............... 29/407.1 |
| 4,699,757 A * | 10/1987 | Cloue ......................... 376/412 |
| 7,017,670 B2 * | 3/2006 | Hazel et al. ................ 166/382 |

* cited by examiner

Primary Examiner — Rick Palabrica
Assistant Examiner — Erin M Leach
(74) Attorney, Agent, or Firm — Hershkovitz & Associates, LLC; Abe Hershkovitz

(57) ABSTRACT

The present invention relates to a fuel rod of a nuclear fuel assembly having a vase-like compression spring adapted to increase the internal volume thereof wherein when the vase-like compression spring is inserted into a cladding tube, it has a relatively smaller volume occupied inside the fuel rod when compared with the existing coil type compression spring, such that the vase-like compression spring can ensure a sufficient space portion receiving the fission gases generated during the operation of the fuel rod, thereby increasing the burn-up performance of the fuel rod and the mechanical integrity thereof.

5 Claims, 10 Drawing Sheets

[Fig 6]
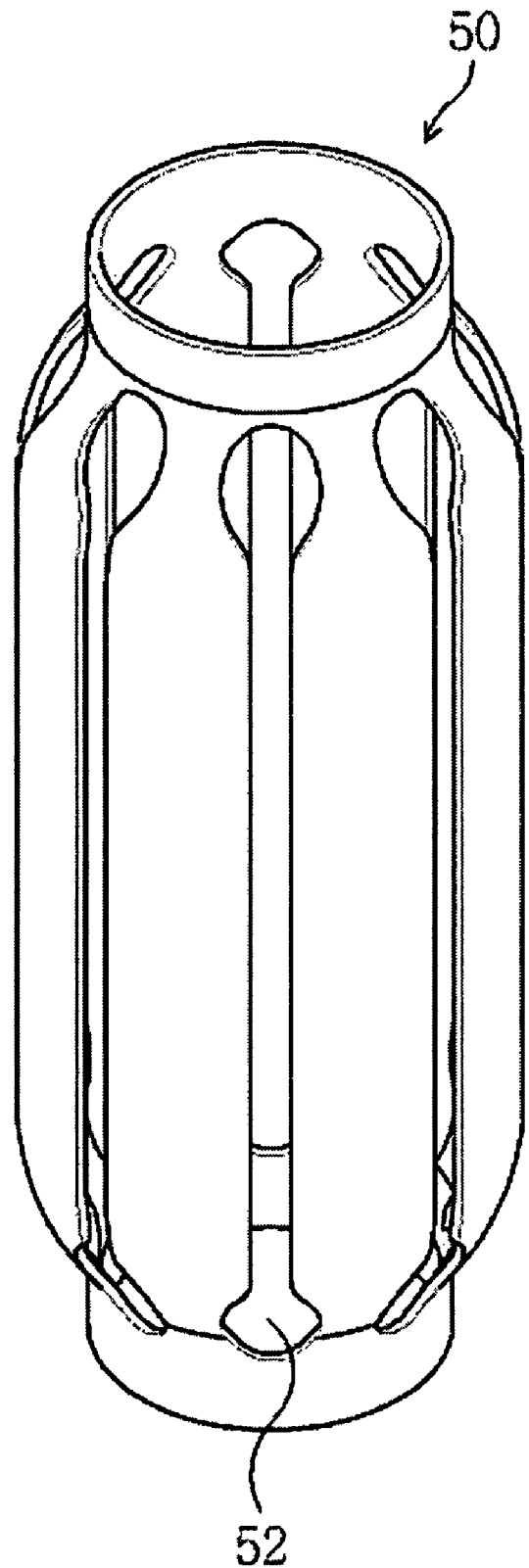

【Fig 7】
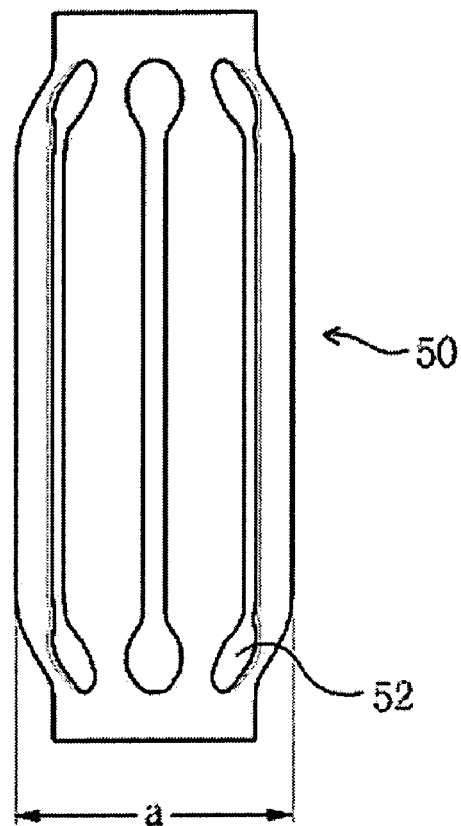
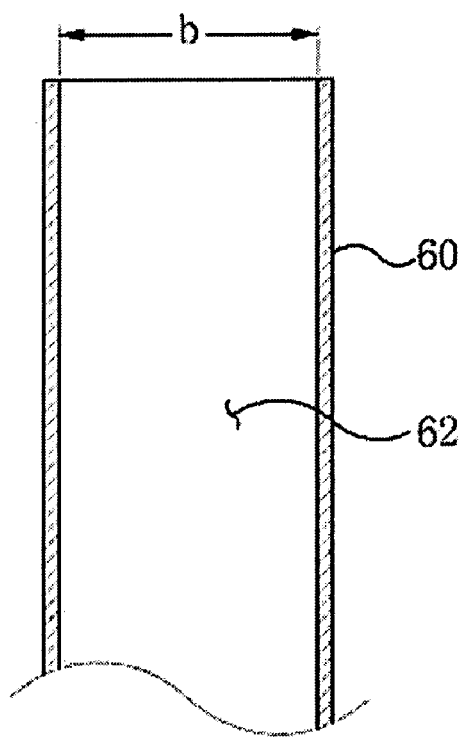

[Fig 8]
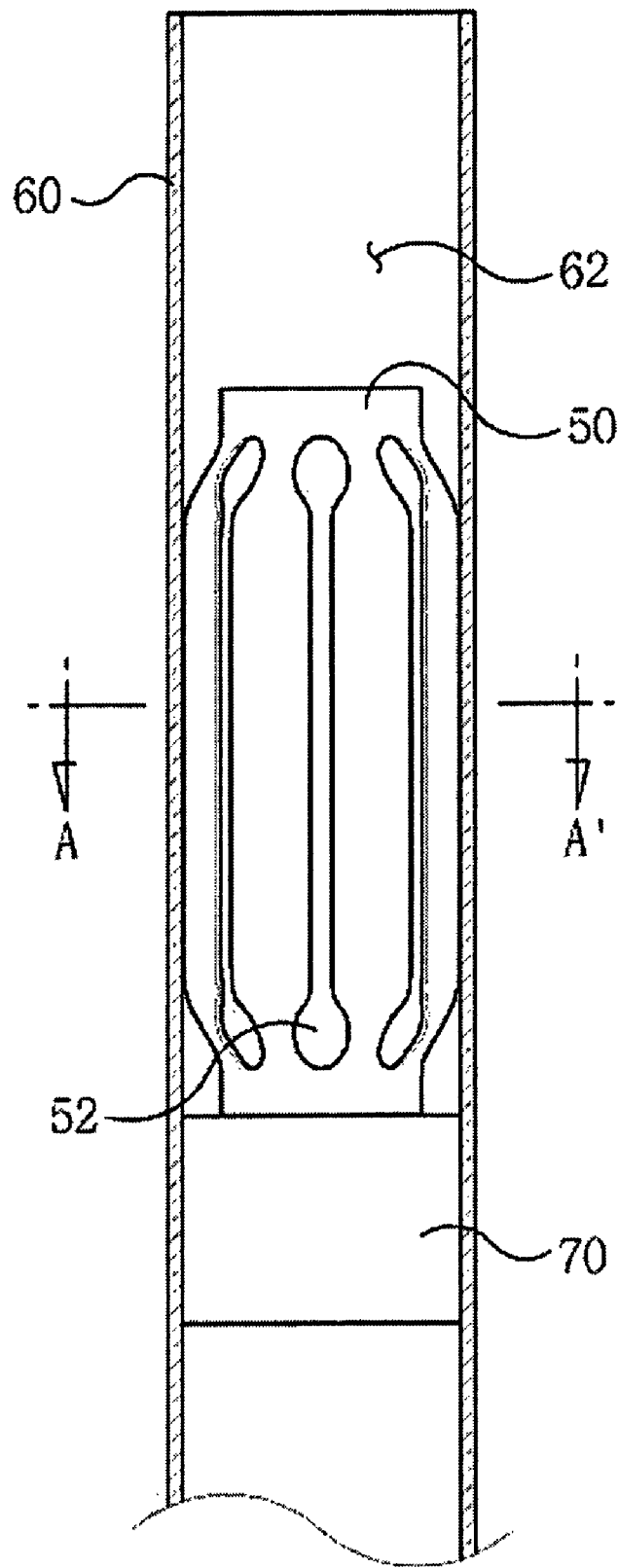

[Fig 9]
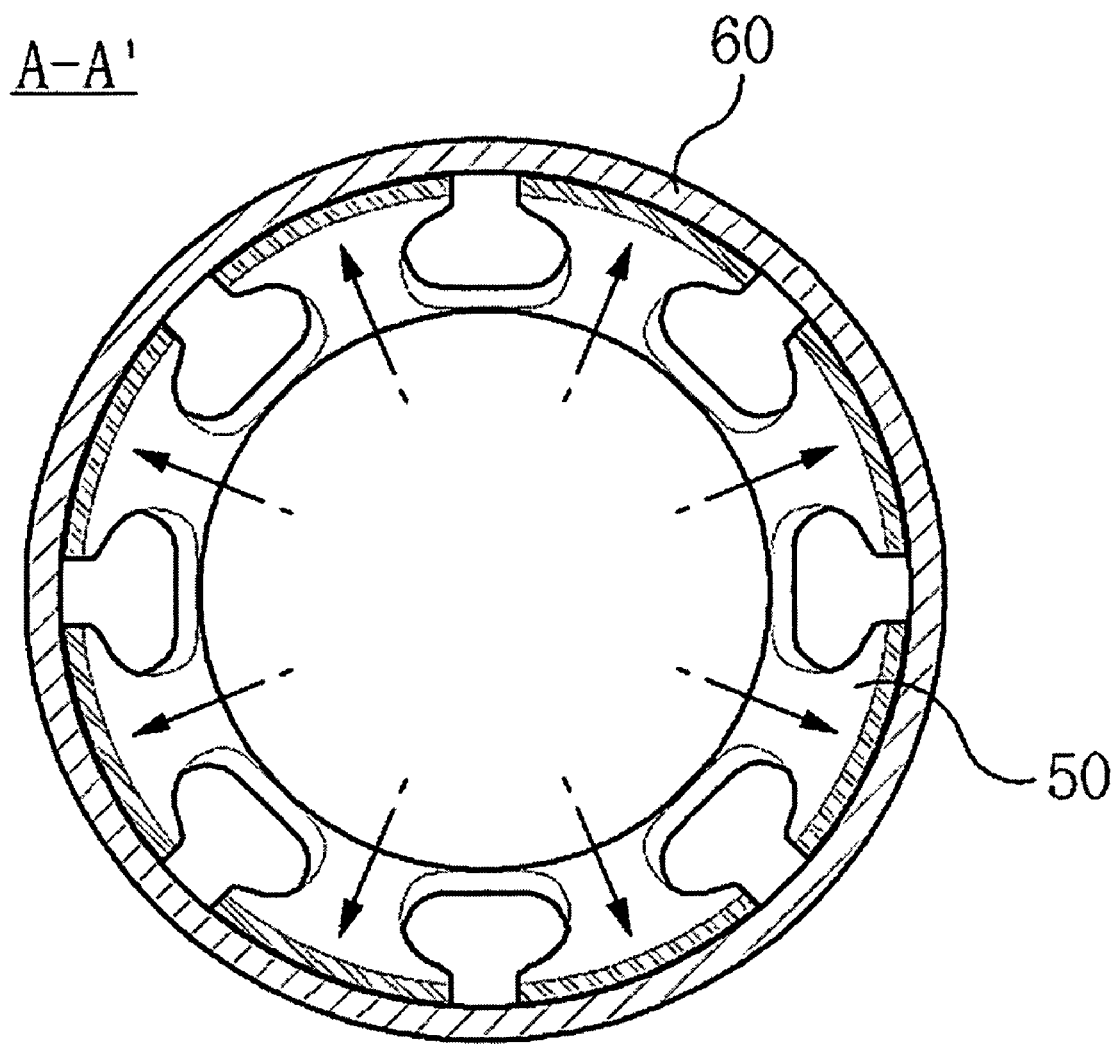

FUEL ROD OF NUCLEAR FUEL ASSEMBLY

This is a non-provisional application which claims priority from Korean patent application 10-2007-0086137 filed on Aug. 27, 2007, which is incorporated herein by reference.

BACKGROUND OF THE INVENTION

1. Field of the Invention

A nuclear reactor is a device that artificially controls the chain reaction of the nuclear fission of fissile materials, thereby achieving a variety of purposes such as the generation of heat, the production of radioisotopes and plutonium, the formation of radiation fields, or the like.

2. Background of the Related Art

A nuclear reactor is a device that artificially controls the chain reaction of the nuclear fission of fissile materials, thereby achieving a variety of use purposes such as the generation of heat, the production of radioisotopes and plutonium, the formation of radiation fields, or the like.

Generally, a nuclear fuel assembly basically includes a frame body comprised of a top nozzle, a bottom nozzle, a plurality of spacer grids, guide thimbles and an instrumentation tube, and a plurality of fuel rods held longitudinally in an organized array by the spacer grids spaced along the length thereof in such a manner as to be supported by means of springs and dimples disposed within the spacer grids. So as to prevent the formation of the scratches on the fuel rods and the generation of the damage on the springs within the spacer grids upon assembling the nuclear fuel assembly, thereafter, the fuel rods have a locker applied thereon and are then inserted into the frame body of the nuclear fuel assembly. Next, the top and bottom nozzles are secured to the opposite ends of the nuclear fuel assembly, thereby finishing the assembling procedure of the nuclear fuel assembly. Then, after the locker of the finished assembly is removed, the distances between the fuel rods, the distances between the fuel rods, the distortion of the nuclear fuel assembly, the total length thereof, and the dimension thereof are checked out, thereby finishing the manufacturing procedure of the nuclear fuel assembly.

FIG. 1 is a sectional view showing a general structure of a fuel rod.

Referring to FIG. 1, the fuel rod basically includes a plurality of fuel pellets 3 for generating heat in a nuclear fuel assembly; a cladding tube 1 for transmitting the heat to reactor core coolant and serving as a receptacle for the fuel pellets 3; a coil type compression spring 4 adapted to compress the fuel pellets 3 with given load for preventing the movements of the fuel pellets 3 in a length direction of the fuel rod, thereby preventing the damage and breakage of the fuel pellets 3 while the nuclear fuel assembly is transported and handled; and an upper end plug 5 and a lower end plug 2 adapted to be welded to the cladding tube 1 at the upper and lower ends of the cladding tube 1 for preventing the fuel pellets 3 inserted into the cladding tube 1 from escaping from the fuel rod after sealing (wherein the structure of the coil type compression spring is shown in more detail in FIG. 2).

In the assembling process of the fuel rod in the nuclear fuel assembly, the cladding tube 1 and the lower end plug 2 are first welded to each other, and after the fuel pellets 3 are inserted into the cladding tube 1, the coil type compression spring 4 is compressed against the fuel pellets 3 and inserted into the cladding tube 1 by means of the upper end plug 5. Next, the upper end plug 5 and the cladding tube 1 are welded to each other at an appropriate inert gas atmosphere.

As shown in FIG. 3, if the coil type compression spring 4 is compressed by means of the upper end plug 5 during the manufacturing of the fuel rod, buckling where the coil type compression spring 4 is bent may undesirably occur. Unfortunately, in case where the buckling of the coil type compression spring 4 occurs, the productivity of the fuel rod is remarkably reduced, and also, the upper end plug 5 that is adapted to completely separate the fuel pellets 3 from the reactor coolant is not welded well to the cladding tube 1.

The fuel pellets 3 are materials for producing the energy within the nuclear reactor, and in a light water nuclear reactor, enriched uranium obtained by raising a ratio of uranium-235 to a range between 2% and 5% is generally used. The enriched uranium is molded to a cylindrical pellet having a weight of about 5.2 g and a diameter of about 8.05 mm, such that about 356 fuel pellets are inserted into each fuel rod and about 96,000 fuel pellets are into each nuclear fuel assembly.

Through the nuclear fission of the fuel pellets 3, heat is generated from the nuclear fuel assembly, and during the nuclear fission, a great lot of gases are generated from the fuel pellets 3. The gases are accumulated in the interior of the fuel rod made by welding the cladding tube 1 to the upper end plug 5 and the lower end plug 2 during the burn-up of the nuclear fuel assembly, so that the internal pressure of the cladding tube 1 of the fuel rod is increased to generate the stress in the cladding tube 1 of the fuel rod, thereby damaging the integrity of the fuel rod.

So as to solve the above-mentioned problems, thus, there is proposed prior art U.S. Pat. No. 4,460,540 entitled 'Burnable poison rod for a nuclear reactor fuel assembly'.

The prior art does not employ the coil type compression spring, but employs a clip type compression spring, which is shown in FIGS. 4a and 4b.

FIG. 4a shows the clip type compression spring 10 prior to the insertion into the cladding tube 12. The clip type compression spring 10 is formed of a hollow circular tube and has a somewhat larger diameter than that of the cladding tube 12. Also, the clip type compression spring 10 is cut up and down along the side periphery thereof by a predetermined width, and when viewed at the top, it has a 'C'-like shape.

Referring to FIG. 4b, since the diameter of the clip type compression spring 10 is larger than that of the cladding tube 12 when the clip type compression spring 10 is inserted into the cladding tube 12, the contraction of the clip type compression spring 10 in the hollow direction thereof occurs by the incised portion of the clip type compression spring 10 formed at the opposite side with respect to an elastic center point 11 formed by the shape characteristics of the clip type compression spring 10, thereby inserting the clip type compression spring 10 into the cladding tube 12. After the insertion, the clip type compression spring 10 applies a pushing force to the internal peripheral wall of the cladding tube 12 by the elastic restoring force thereof.

Since the clip type compression spring 10 has a larger outer diameter than the inner diameter of the cladding tube 12, however, the outer periphery of the clip type compression spring 10 is not completely brought into contact with the inner peripheral wall of the cladding tube 12 according to the difference between the outer diameter of the clip type compression spring 10 and the inner diameter of the cladding tube 12 and the material properties, when the clip type compression spring 10 comes into contact with the inner peripheral wall of the cladding tube 12, such that the assembling stability may be undesirably diminished.

As shown in FIG. 5, the clip type compression spring 10 makes the use of the elastic force in the hollow direction thereof, such that as the elastic force of the clip type compression spring 10 is decreased toward the elastic center point 11 thereof, the forces applied to the inner peripheral wall of the cladding tube 12 are different from one another, thereby generating irregular forces on the inner peripheral wall of the fuel rod. This causes excessive stress to be generated partially on the inner peripheral wall of the fuel rod, thereby damaging the integrity of the fuel rod.

SUMMARY OF THE INVENTION

Accordingly, the present invention has been made in view of the above-mentioned problems occurring in the prior art, and it is an object of the present invention to provide a fuel rod of a nuclear fuel assembly having a vase-like compression spring adapted to increase the internal volume thereof wherein the vase-like compression spring comes into close contact with the inner peripheral surface of a cladding tube of the fuel rod when insertion into the cladding tube, thereby preventing the stress condensation caused by the application of irregular spring forces.

To accomplish the above object, there is provided a fuel rod of a nuclear fuel assembly having an increased internal volume, including: a cladding tube serving as a fuel rod body; a plurality of fuel pellets stacked on each other inside the cladding tube; an upper end plug and a lower end plug coupled on the upper and lower portions of the cladding tube, for supporting the plurality of fuel pellets; and an elastic means inserted into the cladding tube in such a manner as to be disposed between the upper end plug and the fuel pellets, for elastically supporting the fuel pellets by using a given elastic force generated therefrom, wherein the elastic means is of a generally vase-like hollow cylindrical shape and has a plurality of incised portions formed in a lengthwise direction around the outer peripheral surface abutting against the inner peripheral surface of the cladding tube, thereby providing the given elastic force.

According to the present invention, therefore, there is provided a fuel rod of a nuclear fuel assembly having a vase-like compression spring adapted to increase the internal volume thereof wherein when the vase-like compression spring is inserted into a cladding tube, it has a relatively smaller volume occupied inside the fuel rod when compared with the existing coil type compression spring, such that the vase-like compression spring can ensure a sufficient space portion receiving the fission gases generated during the operation of the fuel rod, thereby increasing the burn-up performance of the fuel rod and the mechanical integrity thereof, and wherein at the state where the vase-like compression spring is inserted inside the cladding tube, the forces applied to the inner peripheral surface of the cladding tube are under a constant level irrespective of the applied direction thereof, thereby maintaining the operation state of the fuel rod in a substantially more stable manner.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 6 is a perspective view showing a vase-like compression spring of a fuel rod according to the present invention;

FIG. 7 is a side sectional view showing the vase-like compression spring of the present invention prior to the insertion into a cladding tube of the fuel rod;

FIG. 8 is a side sectional view showing the vase-like compression spring of the present invention after the insertion into a cladding tube of the fuel rod; and FIG. 9 is a plane view showing the vase-like compression spring of the present invention taken along the line A-A in FIG. 8.

DETAILED DESCRIPTION OF THE PREFERRED EMBODIMENT

Figure 1:
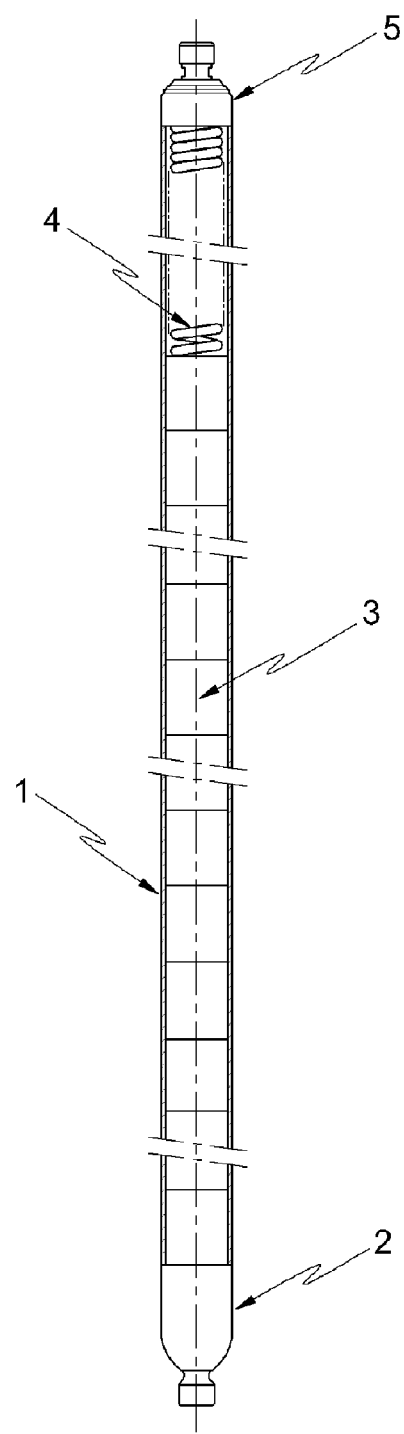
FIG. 1 is a sectional view showing a general structure of a fuel rod.
Figure 2:
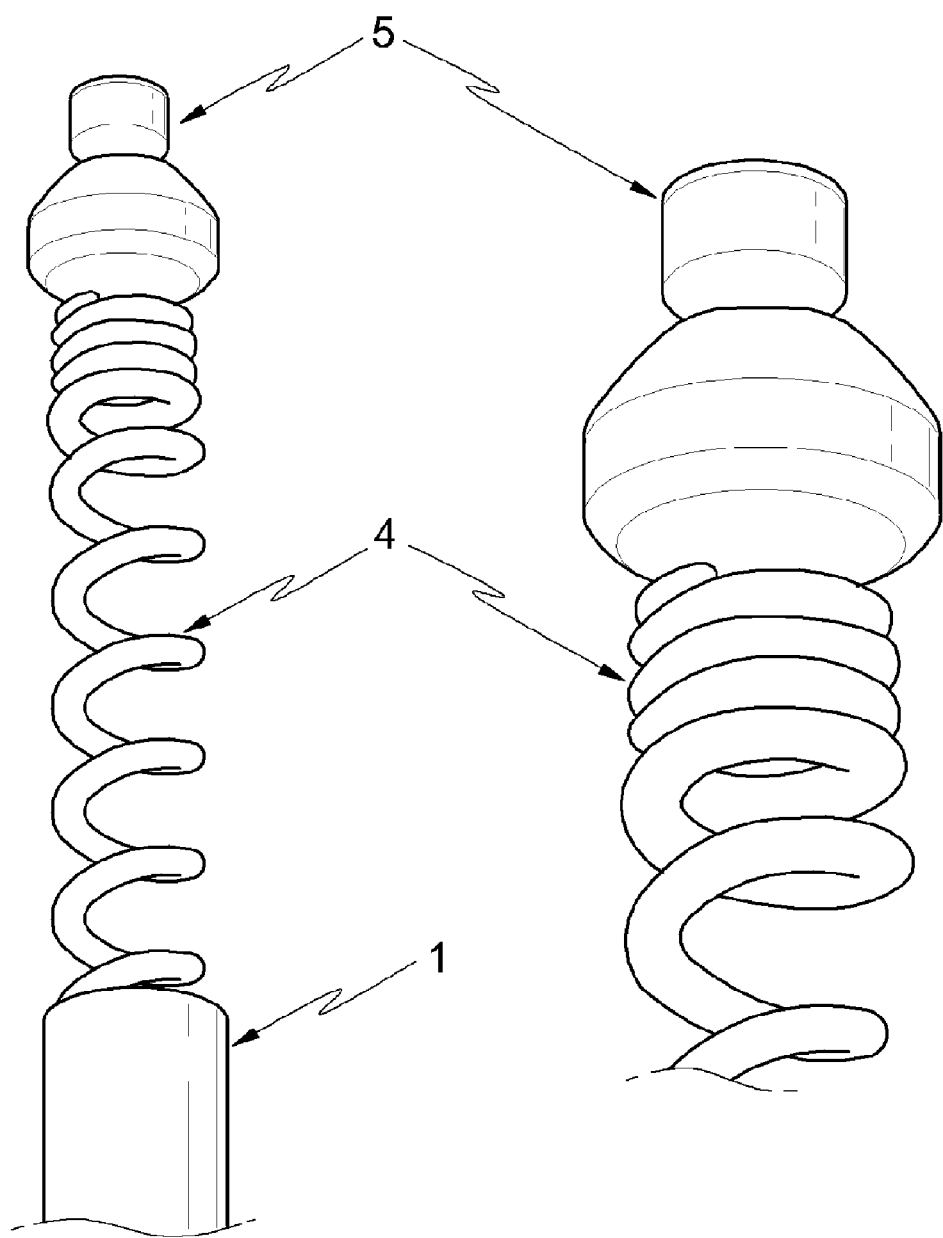
FIG. 2 is a perspective view showing a conventional compression spring in a fuel rod.
Figure 3:
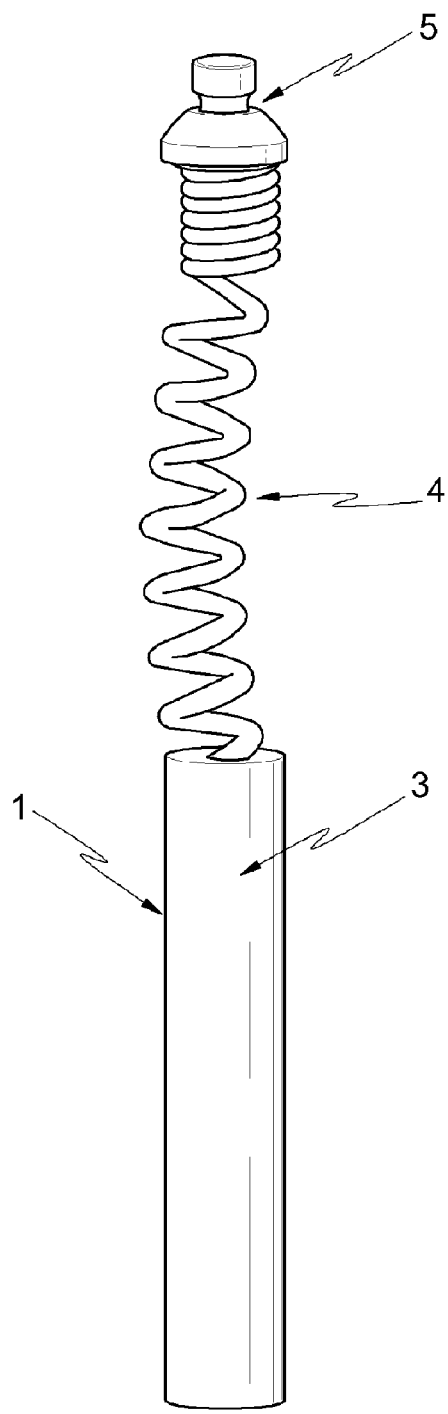
FIG. 3 is a perspective view showing the conventional compression spring at the time of being inserted into a cladding tube of the fuel rod.
Figure 4A:
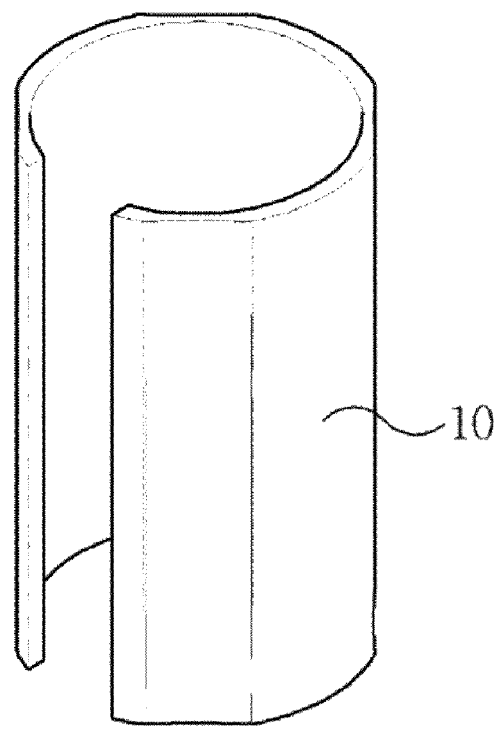
FIGS. 4a and 4b are perspective and plane views showing a conventional clip type compression spring.
Figure 4A:
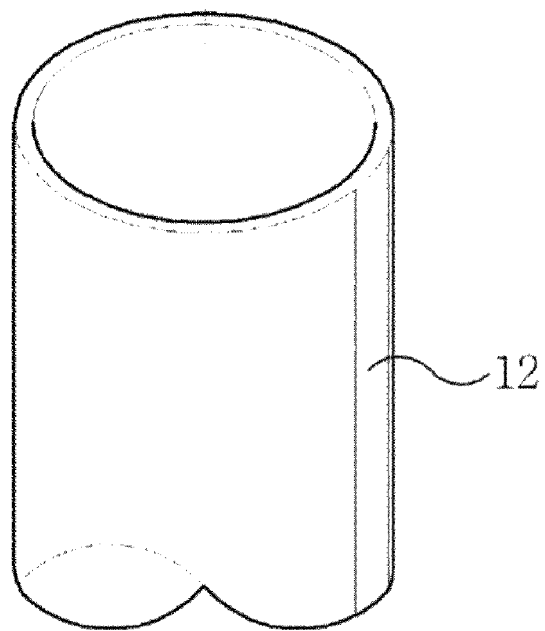
Figure 4B:
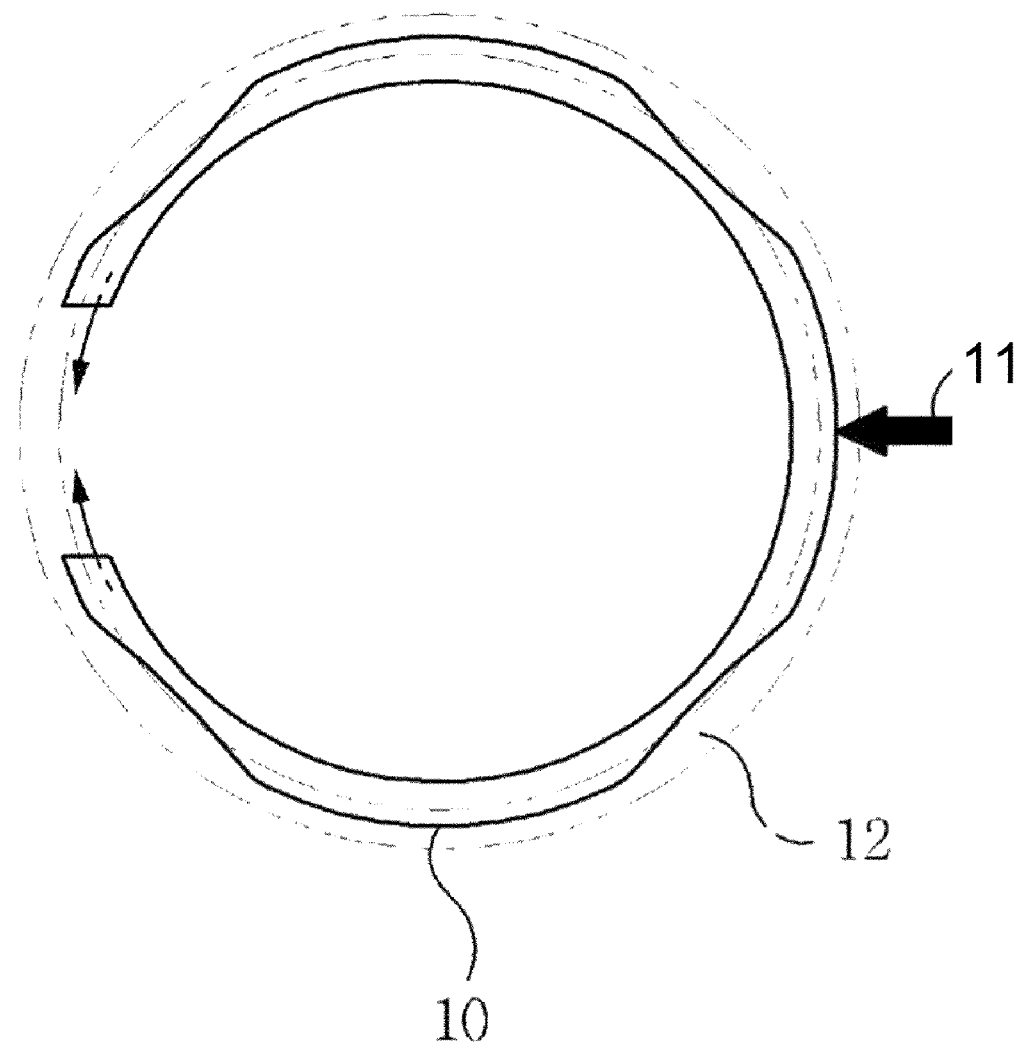
Figure 5:
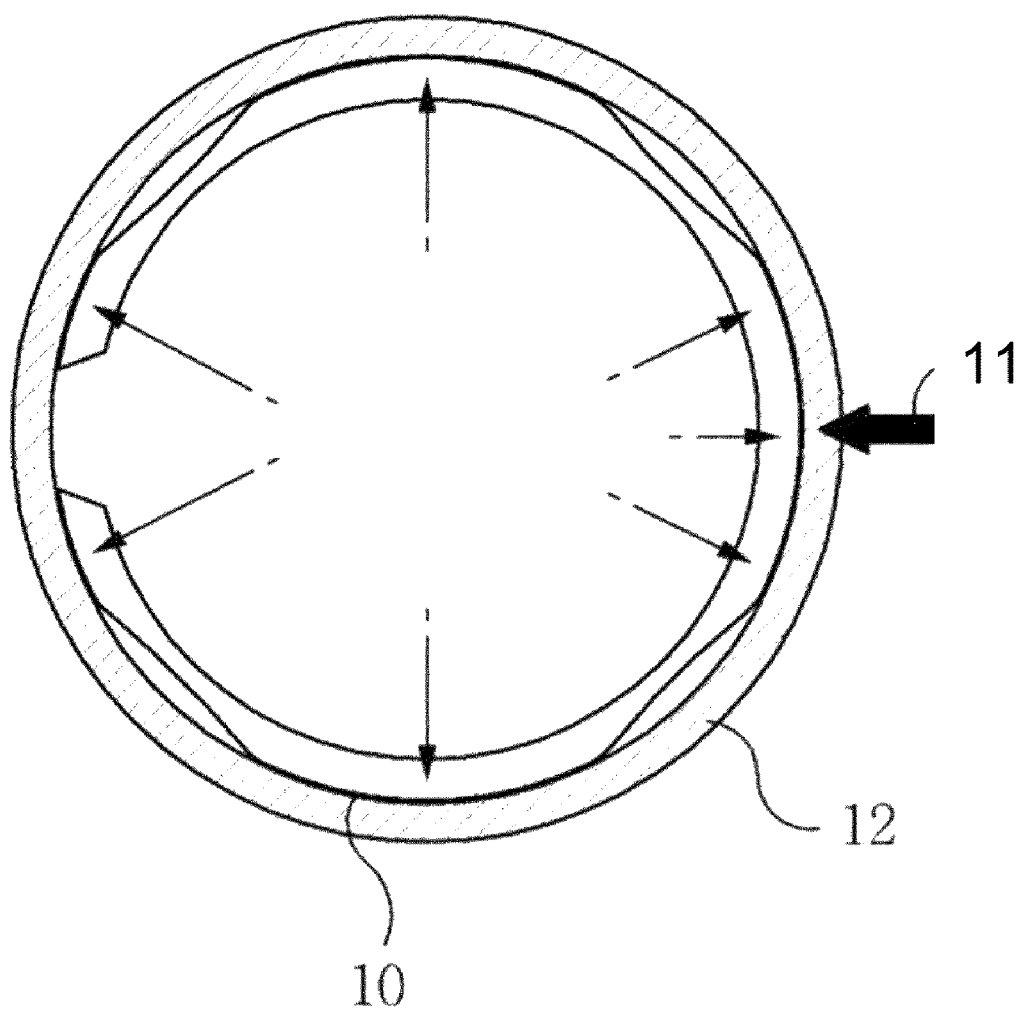
FIG. 5 is a plane view showing the conventional clip type compression spring at the time of being inserted into a cladding tube of the fuel rod.

Hereinafter, an explanation on a fuel rod of a nuclear fuel assembly having a vase-like compression spring adapted to increase the internal volume thereof according to the present invention will be given with reference to the attached drawings.

According to the present invention, there is provided a fuel rod of a nuclear fuel assembly having an increased internal volume, including: a cladding tube serving as a fuel rod body; a plurality of fuel pellets stacked on each other inside the cladding tube; an upper end plug and a lower end plug coupled on the upper and lower portions of the cladding tube, for supporting the plurality of fuel pellets; and a compression spring disposed between the upper end plug and the fuel pellets, for preventing the movement of the fuel rod in an axial direction by using a given elastic force generated therefrom, wherein the compression spring is of a generally vase-like hollow cylinder made of a metal material and has a plurality of incised portions formed in a lengthwise direction around the outer peripheral surface abutting against the inner peripheral surface of the cladding tube (in this case, the compression spring is not limited to the coil type compression spring, but includes an elastic means having a given elastic force).

Now, an explanation on the compression spring used for a fuel rod according to the present invention will be given with reference to the attaching drawings.

As shown in FIG. 6, the compression spring 50 is of a generally vase-like hollow cylinder, such that an outer diameter of the both upper and lower end portions of the compression spring 50 is smaller than the inner diameter (b) of a cladding tube 60 of the fuel rod. The compression spring comes into contact with the inner circumferential surface of the cladding tube 60. The compression spring has an elastic portion where plural incised portions are formed in a longitudinal direction in the middle of the compression spring. The upper and lower end portions of the compression spring each have a ring shape of which diameters are smaller than the diameter (a) of the elastic portion. The diameter (a) of the elastic portion is larger than the inner diameter (b) of the cladding tube 60 of the fuel rod (See FIG. 7).

Hereinafter, the compression spring 50 is referred to as a vase-like compression spring.

The length of the vase-like compression spring 50 is shorter than that of an internal space portion 62 formed inside the cladding tube 60 after a plurality of fuel pellets are inserted into the cladding tube 60.

The vase-like compression spring 50 is made of a thin metal and has a plurality of incised portions 52 formed longitudinally around the outer periphery thereof, such that the metal parts between the incised portions 52 exert the elastic force like a spring.

The incised portion formed in a part where the upper and lower portions of the elastic portion are connected, i.e., a part where a diameter of the elastic portion decreases is formed larger than the other portions thereof. This enables the compression spring 50 to be more effectively expanded and contracted when inserted into the cladding tube 60, which will be in more detail explained.

FIG. 8 is a side sectional view showing the vase-like compression spring 50 of the present invention after the insertion into the cladding tube 60 of the fuel rod, wherein the lower end portion of the vase-like compression spring 50 is inserted above the fuel pellets 70 and is brought into contact with the fuel pellets 70, thereby rigidly holding the fuel pellets 70.

Under the above-mentioned assembling process, the buckling occurring when the generally coil type compression spring is inserted into the cladding tube does not happen at all.

Further, the vase-like compression spring 50 has the elastic properties by the formation of the incised portions 52 and has the middle portion having a larger diameter than the inner diameter of the cladding tube 60, which is allowed to be more extended in an axial direction thereof after the insertion into the cladding tube 60.

Additionally, the vase-like compression spring 50 has a relatively smaller volume occupied in an internal space portion 62 of the cladding tube 60 when compared with the existing coil type compression spring, the internal space portion 62 being formed by the difference between the internal volume of the cladding tube 60 and the volume of the fuel pellets 70, so that additional space can be provided into the cladding tube 60 for receiving the gases generated by the fuel pellets 70 during the operation of the nuclear fuel assembly.

The formation of the additional internal space allows the burn-up performance and the mechanical integrity of the fuel rod to be more improved.

Furthermore, FIG. 9 shows the vase-like compression spring of the present invention taken along the line A-A in FIG. 8, and as shown, the vase-like compression spring 50 that is inserted into the cladding tube 60 pushes against the inner peripheral surface of the cladding tube 60 with a constant force in every direction.

As a result, the vase-like compression spring 50 supports the fuel pellets 70 at a constant spring force, which permits the fuel pellets 70 to be more rigidly held in the cladding tube 60, and also, the spring pressure is constantly applied against the inner peripheral surface of the cladding tube 60, which allows the fuel rod to be stably assembled and operated.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A fuel rod suitable for use in a nuclear fuel assembly, the fuel rod comprising:
    a cladding tube serving as a fuel rod body;
    a plurality of fuel pellets stacked inside the cladding tube;
    an upper end plug and a lower end plug each coupled to a top portion and a bottom portion of the cladding tube, respectively, the upper end plug and the lower end plug being configured to support the plurality of fuel pellets; and
    an elastic compression spring inserted into the cladding tube, the elastic compression spring being disposed between the upper end plug and the fuel pellets, and configured to support the fuel pellets by elastic force, wherein the elastic compression spring is of a hollow cylindrical shape;
    wherein the elastic compression spring is at least partially in contact with an inner circumferential surface of the cladding tube;
    wherein the elastic compression spring comprises:
        an elastic portion including a plurality of closed-loop shaped incised portions located in a longitudinal direction in the middle of the elastic compression spring;
        top and bottom ends having a closed ring shape, the closed ring shape having an outer diameter smaller than an outer diameter of the elastic portion;
        the outer diameter of the top and bottom ends being smaller than an inner diameter of the cladding tube; and
        the outer diameter of the elastic portion being larger than the inner diameter of the cladding tube before insertion of the elastic compression spring into the cladding tube, wherein the elastic portion is contracted when the elastic compression spring is inserted into the cladding tube.

2. The fuel rod according to claim 1, wherein the elastic compression spring has a length shorter than that of a space portion of the cladding tube formed after the fuel pellets are stacked inside the cladding tube.

3. The fuel rod according to claim 1, wherein each of the plurality of closed-loop incised portions comprises:
    a uniform width in a longitudinal direction in the middle of the elastic portion; and
    a circular shaped top portion and a circular shaped bottom portion located in a top portion and a bottom portion of the elastic portion, respectively,
    wherein diameters of the circular shaped top portion and the circular shaped bottom portion are greater than the uniform width of the elastic portion.

4. A fuel rod suitable for use in a nuclear fuel assembly, the fuel rod comprising:
    a cladding tube serving as a fuel rod body;
    a plurality of fuel pellets stacked inside the cladding tube;
    an upper end plug and a lower end plug each coupled to a top portion and a bottom portion of the cladding tube, respectively, the upper end plug and the lower end plug being configured to support the plurality of fuel pellets; and
    an elastic compression spring inserted into the cladding tube, the elastic compression spring being disposed between the upper end plug and the fuel pellets, and configured to support the fuel pellets by elastic force, wherein the elastic compression spring is of a hollow cylindrical shape,
    wherein the elastic compression spring is at least partially in contact with an inner circumferential surface of the cladding tube,
    wherein the elastic compression spring comprises:
        an elastic portion including a plurality of closed-loop shaped incised portions located in a longitudinal direction in the middle of the elastic compression spring;
        top and bottom ends having a closed ring shape, the closed ring shape having an outer diameter smaller than an outer diameter of the elastic portion;
        the outer diameter of the top and bottom ends being smaller than an inner diameter of the cladding tube; and the outer diameter of the elastic portion being larger than the inner diameter of the cladding tube before insertion of the elastic compression spring into the cladding tube, wherein the elastic portion is contracted when the elastic compression spring is inserted into the cladding tube, wherein the elastic compression spring has a length shorter than that of a space portion of the cladding tube formed after the fuel pellets are stacked inside the cladding tube, and wherein each of the plurality of closed-loop incised portions comprises:

a uniform width in a longitudinal direction in the middle of the elastic portion; and a circular shaped top portion and a circular shaped bottom portion located in a top portion and a bottom portion of the elastic portion, respectively, wherein diameters of the circular shaped top portion and the circular shaped bottom portion are greater than the uniform width of the elastic portion.

5. A fuel rod suitable for use in a nuclear fuel assembly, the fuel rod comprising:

a cladding tube serving as a fuel rod body;

a plurality of fuel pellets stacked inside the cladding tube;

an upper end plug and a lower end plug each coupled to a top portion and a bottom portion of the cladding tube, respectively, the upper end plug and the lower end plug being configured to support the plurality of fuel pellets; and an elastic compression spring inserted into the cladding tube, the elastic compression spring being disposed between the upper end plug and the fuel pellets, and configured to support the fuel pellets by elastic force, wherein the elastic compression spring is of a hollow cylindrical shape, wherein the elastic compression spring is at least partially in contact with an inner circumferential surface of the cladding tube, wherein the elastic compression spring comprises:

an elastic portion including a plurality of closed-loop shaped incised portions located in a longitudinal direction in the middle of the elastic compression spring, the elastic portion being configured to be in direct contact with the cladding tube;

top and bottom ends having a closed ring shape, the closed ring shape having an outer diameter smaller than an outer diameter of the elastic portion;

the outer diameter of the top and bottom ends being smaller than an inner diameter of the cladding tube; and the outer diameter of the elastic portion being larger than the inner diameter of the cladding tube before insertion of the elastic compression spring into the cladding tube, wherein the elastic portion is contracted when the elastic compression spring is inserted into the cladding tube, and wherein each of the plurality of closed-loop incised portions comprises:

a uniform width in a longitudinal direction in the middle of the elastic portion; and a circular shaped top portion and a circular shaped bottom portion located in a top portion and a bottom portion of the elastic portion, respectively.

* * * * *